US010587384B2

(12) United States Patent
Johansson et al.

(10) Patent No.: US 10,587,384 B2
(45) Date of Patent: Mar. 10, 2020

(54) SYSTEM, METHOD, AND APPARATUS FOR SELECTING THE SIZE OF A CONTROL REGION OF A SUBFRAME BASED ON DATA REGION LOAD

(71) Applicant: Telefonaktiebolaget LM Ericsson (publ), Stockholm (SE)

(72) Inventors: Anders Johansson, Hässelby (SE); Carola Faronius, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 49 days.

(21) Appl. No.: 16/067,629

(22) PCT Filed: Jan. 14, 2016

(86) PCT No.: PCT/SE2016/050014
§ 371 (c)(1),
(2) Date: Jul. 2, 2018

(87) PCT Pub. No.: WO2017/123125
PCT Pub. Date: Jul. 20, 2017

(65) Prior Publication Data
US 2019/0013920 A1    Jan. 10, 2019

(51) Int. Cl.
*H04L 5/00* (2006.01)
*H04W 72/04* (2009.01)
*H04W 84/04* (2009.01)

(52) U.S. Cl.
CPC ....... *H04L 5/0053* (2013.01); *H04W 72/0446* (2013.01); *H04W 84/042* (2013.01)

(58) Field of Classification Search
CPC . H04L 5/0053; H04L 27/2666; H04L 5/1415; H04L 5/14; H04L 27/26;
(Continued)

(56) References Cited

U.S. PATENT DOCUMENTS 8,031,670 B2    10/2011  Johansson et al.
2010/0120424 A1*  5/2010  Johansson ............. H04L 5/0053
                                                455/435.1
(Continued)

*Primary Examiner* — Hardikkumar D Patel
(74) *Attorney, Agent, or Firm* — Sage Patent Group

(57) ABSTRACT

A system, method (400), and network node (102) is presented for setting the size of a control region, the PDCCH region (201) of a subframe (200). The PDCCH control region may have a size, indicated by the Control Format Indicator, CFI, transmitted on the PCFICH, that varies between 1 and 3 OFDM symbols. The network node (102) may select (402) an initial size for the control region (201), and determine (404) whether the initial size for the control region is less than a predetermined maximum control region size. In response to determining that the initial size is less than the predetermined maximum control region size, the network node (102) selects (406) a final size for the control region (201) based on a data region load. The data region load indicates a load on all physical downlink shared channels, PDSCHs, on all enhanced PDCCHs, ePDCCHs, in the data region. After selecting the final size for the control region, the network node (102) transmits (408) the subframe (200), wherein the control region of the subframe comprises information identifying the selected final size, and the size of the control region is equal to the selected final size.

24 Claims, 9 Drawing Sheets

(58) Field of Classification Search
CPC ..... H04L 5/0007; H04L 5/003; H04L 5/0044; H04L 5/005; H04L 27/261; H04L 5/0073; H04L 5/0048; H04B 17/345; H04J 11/0023; H04W 4/00; H04W 72/0446; H04W 84/042; H04W 72/04; H04W 72/1252; H04W 72/042; H04W 72/0413; H04W 16/14; H04W 24/08; H04W 4/70; H04W 72/048; H04W 72/0453
See application file for complete search history.

(56) References Cited

U.S. PATENT DOCUMENTS

| | | |
|---|---|---|
| 2014/0146799 A1 | 5/2014 | Park et al. |
| 2017/0085326 A1* | 3/2017 | Li .................. H04B 17/345 |
| 2017/0201982 A1* | 7/2017 | Rico Alvarino .... H04W 72/042 |

* cited by examiner

102

Means for selecting an initial size for the control region (210) of the subframe Means for determining whether the initial size for the control region is less than a predetermined maximum control region size Means for selecting, in response to the determination that the initial size is less than the predetermined maximum control region size, a final size for the control region of the subframe based on a data region load Means for transmitting, after selecting the final size for the control region, the subframe, wherein the control region of the subframe comprises information identifying the selected final size

FIG. 9

SYSTEM, METHOD, AND APPARATUS FOR SELECTING THE SIZE OF A CONTROL REGION OF A SUBFRAME BASED ON DATA REGION LOAD

TECHNICAL FIELD

The present disclosure relates to a system, method, and apparatus for selecting the size of a control region of a subframe based on load.

BACKGROUND

Long Term Evolution (LTE) is a radio access technology standardized by the 3$^{rd}$ Generation Partnership Project (3GPP). LTE is based on orthogonal frequency division multiplexing, OFDM, in the downlink and single-carrier frequency domain multiple access, SC-FDMA, in the uplink.

In the time domain in LTE, one subframe of 1 ms duration is divided into 12 or 14 OFDM (or SC-FDMA) symbols, depending on the configuration. One OFDM (or SC-FDMA) symbol consists of a number of sub-carriers in the frequency domain, depending on the channel bandwidth and configuration. One OFDM (or SC-FDMA) symbol on one sub-carrier is referred to as a resource element, RE.

In LTE, no dedicated data channels are used. Instead, shared channel resources are used in both downlink and uplink. These shared resources, which are referred to as DL-SCH and UL-SCH, are each controlled by a scheduler that assigns different parts of the downlink and uplink shared channels to different communication devices (e.g., user equipments) for reception and transmission respectively.

The assignment information for the DL-SCH and the UL-SCH are transmitted in a control region covering n OFDM symbols in the beginning of each downlink subframe. The variable n generally has a value between 1 and 3, inclusively, for all subframe bandwidths except for a bandwidth of 1.4 MHz, in which case n generally has a value between 2 and 4, inclusively. The DL-SCH is transmitted in a data region (e.g., a shared data region) covering the rest of the OFDM symbols in each downlink subframe. The size of the control region (i.e., the value of n) is set per subframe. The size is signalled to the UE for each subframe, as a control format indicator (CFI) value, on a physical control format indicator channel (PCFICH) in the control region. The PCFICH occupies a certain minor, pre-determined part of the control region, thereby making it independent of the number of OFDM symbols currently used for the control region. A CFI value of 1, for instance, indicates that the control region has a size of 1 symbol.

Each assignment for DL-SCH or UL-SCH is transmitted on a physical downlink control channel (PDCCH) located in the control region. There are typically multiple PDCCHs in each subframe, and each UE is required to monitor the PDCCHs to detect the assignments directed to it. A PDCCH is mapped to a number of control channel elements (CCEs), which may be a set of 9 resource element groups (REGs), where each REG may be a group of 4 consecutive REs. A PDCCH consists of an aggregation of 1, 2, 4 or 8 CCEs. These four different alternatives are herein referred to aggregation level 1, 2, 4, and 8, respectively. Each CCE may only be utilized on one aggregation level at the time. The variable size achieved by the different aggregation levels is used to adapt the coding rate to the required block error rate (BLER) level for each PDCCH. The total number of available CCEs in a subframe will vary depending on several parameters, some of which are static (bandwidth and number of antennas), some are semi-static (physical HARQ indicator channel (PHICH) size and PHICH duration), and one is dynamic (number of OFDM symbols used for the control region). Each CCE may consist of 36 REs (9 REGs×4 REs/REG). However, in order to achieve time and frequency diversity for the PDCCHs, each CCE and its corresponding REs are spread out, both in time over the OFDM symbols used for PDCCH, and in frequency over the configured bandwidth. This is achieved through a number of operations including interleaving, and cyclic shifts, etc.

The CCH mapping in the control region is also restricted in order to simplify the UE implementation. Depending on a radio network temporary identifier (RNTI), subframe number, and CCE aggregation level, only a limited set of CCEs need to be searched for PDCCHs by a UE. These CCE sets are referred to as common search spaces and UE-specific search spaces depending on if the PDCCH is aimed at a group of UEs or to a specific UE. The UEs recognize PDCCHs aimed at them by the RNTI tag that is attached to each PDCCH.

The PDCCHs are mapped on the control region of the subframe, which can consist of a number of OFDM symbols. The control region size can be varied from one subframe to a subsequent subframe, such as from two OFDM symbols to three OFDM symbols. Increasing the size of the control region may decrease the size of the data region in the subframe, because there may be only a fixed number of OFDM symbols available per subframe (i.e., 12 or 14 OFDM symbols for normal and extended cyclic prefix respectively). This may in turn decrease the available capacity for DL-SCH in the data region. Hence, the control region is an overhead that competes with DL-SCH for resources (i.e., the downlink peak throughput is affected if the control region is larger than what is absolutely required to carry the control channels). If the control region is too small, however, it may not be large enough to carry all PDCCHs required for both DL and UL assignments. This may prevent the sending of all the DL and UL assignments for the UEs, which may result in the DL and/or UL throughput being degraded due to the limited capability to assign DL-SCH and UL-SCH resources to the UEs. Accordingly, it is not optimal to use a fixed control region size for each downlink subframe.

What is desired, therefore, are systems, methods, and apparatuses for selecting, for each downlink subframe, the size of a control region for the downlink subframe.

SUMMARY

The present disclosure is concerned with selecting an initial size for a control region of a subframe, and then, if the initial size is less than a predetermined maximum control region size, selecting a final size for the control region based on a data region load (e.g., a shared data region load). The final size may be greater than the initial size, or may be the same as the initial size.

In LTE, channels including PDCCHs, the PCFICH, the PHICH, and cell specific reference signals (CRSs) may be carried in the first symbol of a subframe. This symbol may be much more exposed to interference from neighboring cells than the following symbols. This means that a PDCCH that is assigned in a subframe with CFI=1 may on average receive more interference than a PDCCH that is assigned in a subframe with CFI=2 or 3.

This interference may lower the performance of an adaptive CFI scheme. The adaptive CFI scheme sets the CFI as small as possible as a function of PDCCH load, so that a low CFI value is selected for low PDCCH loads. The performance of this adaptive CFI scheme may be sub-optimal because it may select the low CFI value even when a high CFI value would not actually restrict or otherwise impair the capacity of the data region of the subframe. Thus, the expected load in the data region (e.g., due to PDSCH and ePDCCH) should also be taken into account when determining the CFI value. If the capacity of the data region would not be impaired by a high CFI value, then a high CFI value may be selected for the control region even when the PDCCH load is low. In some instances, if the expected load in the data region is sufficiently low, the selection of the CFI value for the control region may be performed independent of the PDCCH load. This can improve PDCCH performance by reducing PDCCH inter-cell interference (e.g., interference during handover from one cell to another) when load on the data region is sufficiently low.

One aspect of the present disclosure presents a method performed by a network node (102) for setting the size of a control region (201) of a subframe (200) that comprises the control region (201) and a data region (220) (e.g., shared data region) which follows the control region. In an embodiment, the method comprises: a) the network node (102) selecting (402) an initial size for the control region (201) of the subframe; b) the network node (102) determining (404) whether the initial size for the control region is less than a predetermined maximum control region size; c) in response to determining that the initial size is less than the predetermined maximum control region size, the network node (102) selecting (406) a final size for the control region (201) of the subframe based on a data region load; and d) after selecting the final size for the control region, the network node (102) transmitting (408) the subframe (200), wherein the control region of the subframe comprises information identifying the selected final size, and the size of the control region is equal to the selected final size.

In some implementations, step c) comprises: determining (502) whether the data region load is less than a predetermined threshold; and in response to the determination that the data region load is less than the predetermined threshold, selecting (504) the final size such that the selected final size is greater than the initial size.

In some implementations, the selected final size is less than or equal to the predetermined maximum control region size and does not impair transmission of control signaling or data signaling in a control channel and a data channel, respectively, of the data region (220).

In some implementations, step c) comprises: determining (602A) whether the data region load is less than a first predetermined threshold; in response to determining that the data region load is less than the first predetermined threshold, selecting (604A) the final size of the control region such that the final size equals the predetermined maximum control region size; and in response to determining that the data region load is not less than the first predetermined threshold, determining (602B) whether the data region load is less than a second predetermined threshold greater than the first predetermined threshold.

In some implementations, step c) further comprises: in response to determining that the data region load is less than the second predetermined threshold, selecting (604B) the final size of the control region such that the final size is equal to the predetermined maximum control region size minus 1.

In some implementations, the time duration of the subframe is divided into a plurality of symbols, and the predetermined maximum control region size is equal to three symbols.

In some implementations, the data region load indicates a load on all physical downlink shared channels, PDSCHs (221, 222, 223), in the data region and on all enhanced PDCCHs, EPDCCHs (224, 225), in the data region (220).

In some implementations, the initial size of the control region selected in step a) is selected as a minimum size which supports a PDCCH load on the control region, wherein the PDCCH load indicates how many PDCCHs are to be transmitted in the control region of the subframe.

In some implementations, selection of the final size in step c) is independent of the PDCCH load.

In some implementations, a time duration of the subframe is divided into a plurality of symbols, and wherein the predetermined maximum control region size is three symbols.

In some implementations, step c) increases the initial size of the control region from having only a first symbol to also having a second symbol, the method further comprising re-assigning control channel information from a control channel resource element, CCH RE, in the first symbol to a CCH RE in the second symbol.

In some implementations, the data region load is determined as a percentage of a maximum number of resource blocks, RBs, that can be allocated to the control channel and the data channel in the data region of the subframe.

In some implementations, the data region load is determined before determining whether the initial size is less than the predetermined maximum control region size.

One aspect of the present disclosure presents a network node (102) (e.g., a base station) capable of transmitting a subframe (200) that comprises a control region (201) and a data region (220) which follows the control region. The network node (102) comprises one or more processors (802) configured to: a) select (402) an initial size for the control region (201) of the subframe; b) determine (404) whether the initial size for the control region is less than a predetermined maximum control region size; c) in response to determining that the initial size is less than the predetermined maximum control region size, select (406) a final size for the control region (201) of the subframe based on a data region load; and d) after selecting the final size for the control region, transmit (408) the subframe (200), wherein the control region of the subframe comprises information identifying the selected final size, and the size of the control region is equal to the selected final size In some implementations, the one or more processors are configured to select (406) the final size for the control region (201) by: determining (502) whether the data region load is less than a predetermined threshold; and in response to the determination that the data region load is less than the predetermined threshold, selecting (504) the final size such that the selected final size is greater than the initial size.

In some implementations, the selected final size is less than or equal to the predetermined maximum control region size and does not impair transmission of control signaling or data signaling in a control channel and a data channel, respectively, of the data region (220).

In some implementations, the one or more processors are configured to select (406) the final size for the control region (201) by: determining whether the data region load is less than a first predetermined threshold; in response to determining that the data region load is less than the first predetermined threshold, selecting the final size of the control region such that the final size equals the predetermined maximum control region size; in response to determining that the data region load is not less than the first predetermined threshold, determining whether the data region load is less than a second predetermined threshold greater than the first predetermined threshold.

In some implementations, the one or more processors are configured to select (406) the final size for the control region (201) further by: in response to determining that the data region load is less than the second predetermined threshold, selecting (610) the final size of the control region such that the final size is equal to the predetermined maximum control region size minus 1.

In some implementations, the time duration of the subframe is divided into a plurality of symbols, and the predetermined maximum control region size is equal to three symbols.

In some implementations, the data region load indicates a load on all physical downlink shared channels, PDSCHs (221, 222, 223), in the data region and on all enhanced PDCCHs, EPDCCHs (224, 225), in the data region (220).

In some implementations, the one or more processors are configured to select the initial size of the control region as a minimum size which supports a PDCCH load on the control region, wherein the PDCCH load indicates how many PDCCHs are to be transmitted in the control region of the subframe.

In some implementations, the selection of the final size by the one or more processors is independent of the PDCCH load.

In some implementations, a time duration of the subframe is divided into a plurality of symbols, and wherein the predetermined maximum control region size is three symbols.

In some implementations, the one or more processors are configured to select the final size for the control region by increasing the initial size of the control region from having only a first symbol to also having a second symbol, and wherein the one or more processors are further configured to re-assign control channel information from a control channel resource element, CCH RE, in the first symbol to a CCH RE in the second symbol.

In some implementations, the data region load is determined as a percentage of a maximum number of resource blocks, RBs, that can be allocated to the control channel and the data channel in the data region of the subframe.

In some implementations, the one or more processors are configured to determine the data region load before determining whether the initial size is less than the predetermined maximum control region size.

These and other aspects and embodiments are further described herein.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

FIGS. 8-9 are functional block diagrams of a network node, according to an embodiment of the present disclosure.

DETAILED DESCRIPTION

Figure 1:
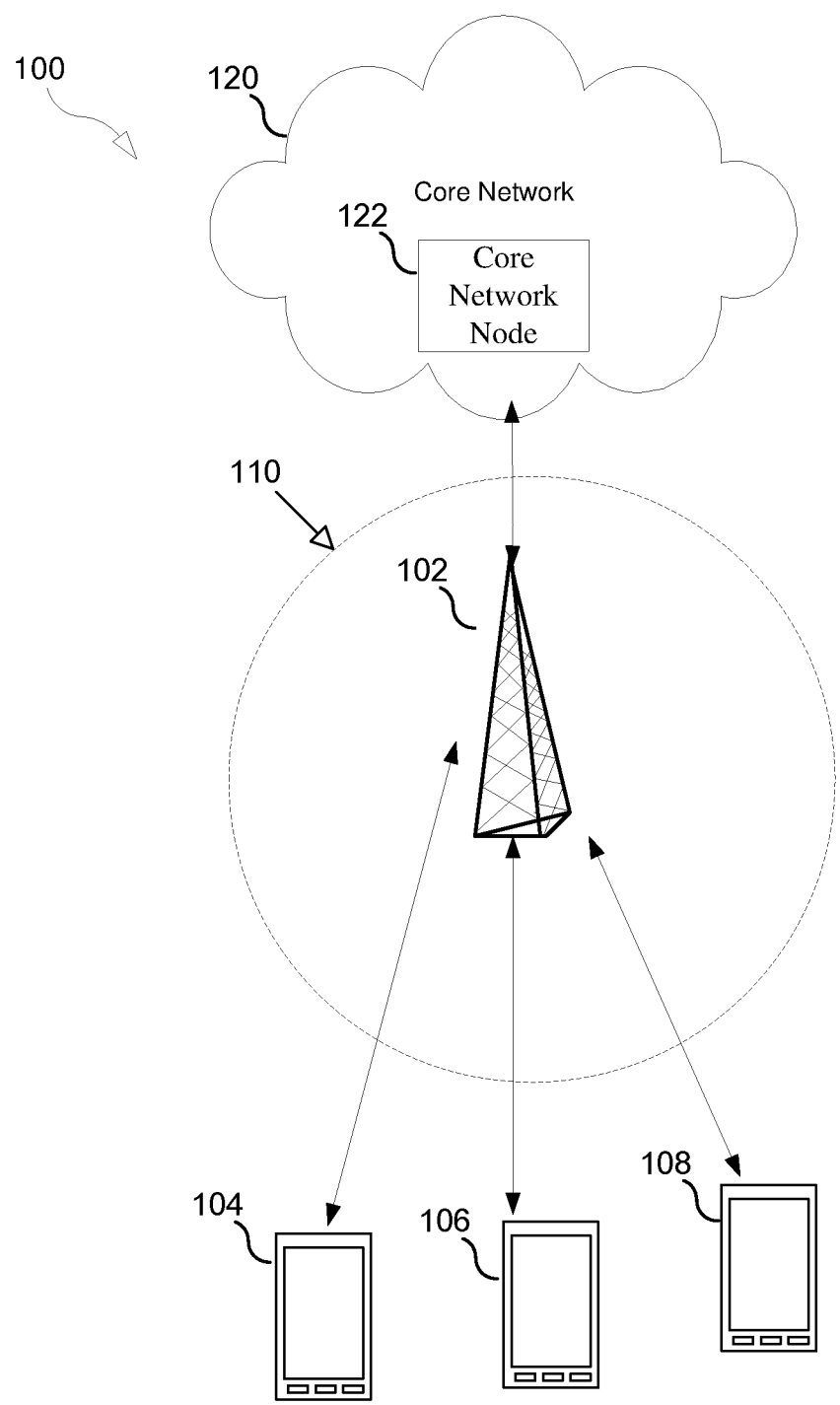
FIG. 1 illustrates a portion of a communications network.

Referring now to FIG. 1, FIG. 1 illustrates a portion of a communications network 100 according to embodiments of the disclosure. As illustrated, network 100 includes a radio access network, RAN, 110 and a core network 120. The RAN 110 includes a network node 102, such as a base station (e.g., an eNB, NB, or BS). The core network 120 includes a core network node 122.

Network node 102 may be in communication with a number of wireless communication devices, WCDs (e.g., user equipments, UEs), such as WCDs 104, 106, 108. WCDs 104, 106, 108 may be attached to the core network 120 through the network node 102, which may communicate with the WCDs via downlink, DL, and uplink, UL, signaling. For instance, network node 102 may be an eNB that periodically transmits (e.g., broadcasts) DL subframes.

Figure 2:
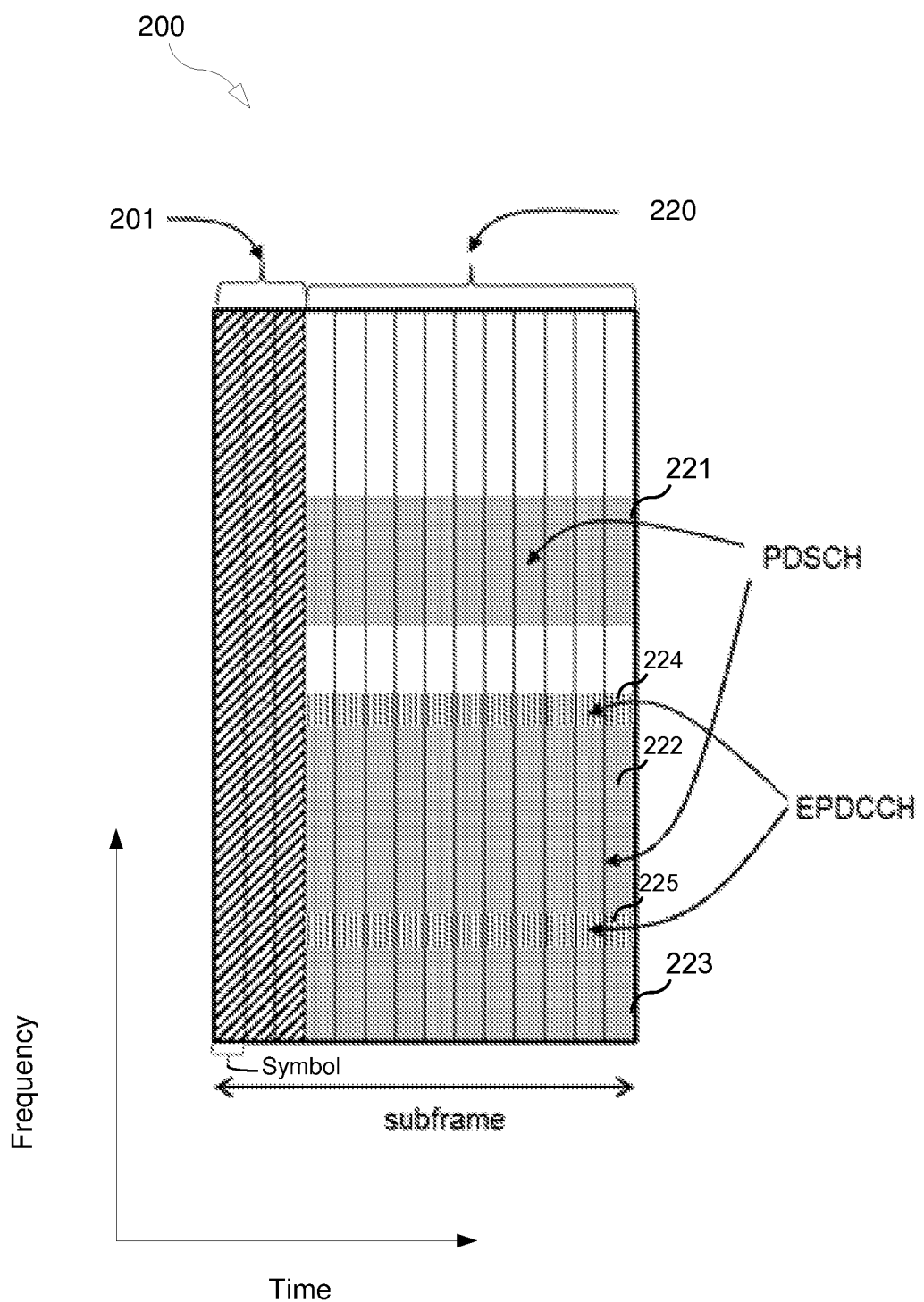
FIG. 2 illustrates a control region and data region of a downlink (DL) subframe.

Referring now to FIG. 2, FIG. 2 illustrates an exemplary DL subframe 200. The subframe 200 illustrated in FIG. 2 is divided in time into a plurality of symbols (e.g., OFDM symbols). For instance, the subframe 200 may be 1 ms in duration and divided into 12 or 14 symbols. Each symbol in the time domain may be divided into a plurality of resource elements, REs, in the frequency domain. Each RE may correspond to a different sub-carrier (or other frequency resource) in the frequency domain. REs may be organized into different units, such as a resource element group, REG, a control channel element, CCE, or a physical resource block, PRB. A REG may be a group of 4 consecutive REs, while a CCE may be a set of 9 consecutive REGs. A RB may be all REs within a range of 6 or 7 symbols and a 12 sub-carriers.

FIG. 2 further illustrates that the symbols of subframe 200 may be organized into a control region 201 and a data region 220 (e.g., a shared data region). The control region 201 may include information used for scheduling transmission resources (e.g., time and/or frequency resources). For instance, it may include one or more physical downlink control channels, PDCCHs, used to indicate, to WCDs that receive the subframe 200, which resource blocks in the data region 220 are assigned to those WCDs. In other words, the subframe 200 may include multiple physical downlink shared channels, PDSCHs, each of which is intended for a different WCD. Each WCD may use downlink control information, DCI, in a PDCCH in the control region to determine which PRBs in the data region correspond to its PDSCH. The PDCCH may occupy one or more CCEs that are spread throughout the control region. Each PDCCH element may be an aggregate of 1, 2, 4, or 8 CCEs. Thus, each PDCCH assignment may act as a "pointer" to the set of REs where the data is actually sent, and may be transmitted on a physical channel named PDCCH in the control region. There are typically multiple PDCCHs in each subframe and UEs will be required to monitor the PDCCHs to be able to detect the assignments directed to them and in that way being able to "find" the data directed to them. The PDCCHs may be spread in frequency and time in a pseudo random manner within the control region, e.g. over the entire downlink bandwidth and over all OFDM symbols assigned to the control region in the current subframe by the CFI value. This functionality is specified by 3GPP in order to achieve as much frequency and time diversity as possible for increased PDCCH performance.

The control region may also include a physical control format indicator channel, PCFICH, that includes a control format indicator, CFI, that indicates the size (e.g., how many symbols) of the control region. FIG. 2 shows an example in which the control region has a size of 3 symbols. As discussed above, a WCD may use the information in the 3 symbols of the control region 201 to determine which, if any, of the information in the data region 220 is intended for the WCD. The control region may also include a Physical HARQ Indicator Channel, PHICH, that carries HARQ ACK for UL transmission and is transmitted in, e.g., the first OFDM symbol of the subframe or over all OFDM symbols used by the control region. The subframe may further include cell specific reference signals, CRSs, that are located in the 1st, 5th, 8th, and 12th symbols of a subframe in the case of normal Cyclic Prefix and 2 antenna ports. When 4 antenna ports are used, the 2nd and 9th symbols may also carry CRSs. For the case of extended cyclic prefix and 2 antenna ports, the CRSs are allocated in symbols 1, 4, 7, and 10. With 4 antenna ports, the 2nd and 8th symbols may also carry CRSs.

In FIG. 2, the data region 220 may occupy the remaining 11 symbols in the subframe 200. The data region 220 may include various channels for data and/or control signaling. Examples of those channels include physical downlink shared channels, PDSCH, 221, 222, 223 and the enhanced physical downlink control channel, ePDCCHs, 224, 225.

One aspect of the present disclosure relates to increasing the size of the control region, by selecting a final size for the control region that may be greater than an initially determined size of the control region. FIG. 3 illustrates an example in which a control region may be increased from a size of one symbol (CFI=1) to a size of two symbols (CFI=2) or three symbols (CFI=3). In one example, the initial size of the control region may be determined as a minimum size which can still optimally handle a large number of PDCCHs. This determination of the control region size on a subframe-by-subframe basis may be part of an adaptive CFI scheme, which is discussed in U.S. Pat. No. 8,031,670, entitled "Systems and Methods for Selecting the Size of a Control Region of a Downlink Subframe," the entire content of which is incorporated by reference. A more detailed discussion of this initial determination of control region size is provided later in this disclosure.

Figures 3A, 3B, 3C:
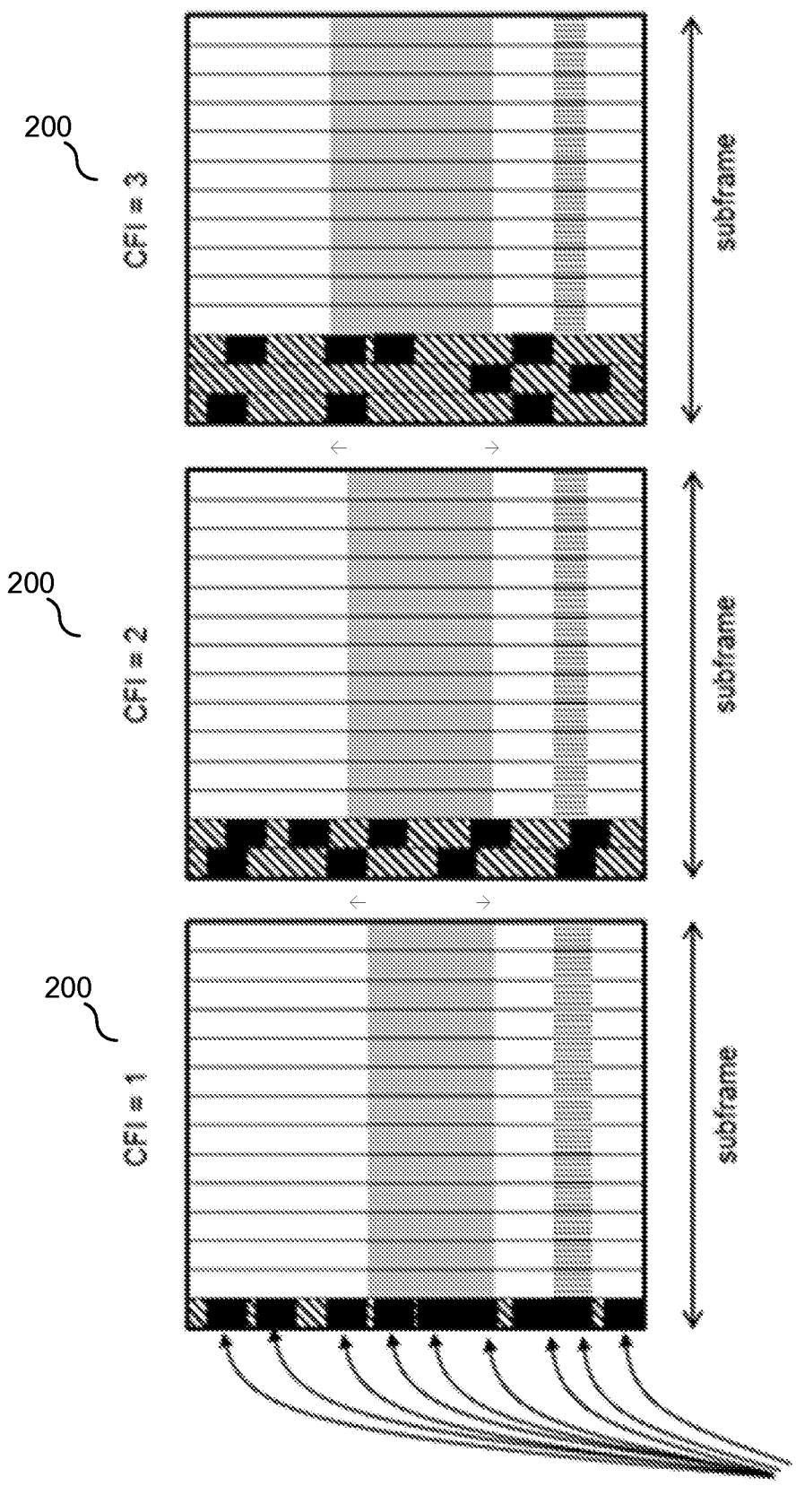
FIG. 3 illustrates a control region and data region of a downlink (DL) subframe.

FIG. 3A shows that the control region may initially be determined to have a size of one symbol, which is adequate to fit a PDCCH needed for scheduling (e.g., assigning) RBs in the data region 220 of the subframe 200. FIG. 3A further shows parts 211 of one PDCCH (the subframe 200 may have additional subcarriers to carry other PDCCHs). Those parts 211 may be, e.g., REs which are assigned or otherwise scheduled to carry DCI or other PDCCH information on the PDCCH.

The transmission of PDCCH information in the control region is, however, subject to interference that degrades performance. In one instance, when the parts 211 of a PDCCH are mapped to only the first symbol in a subframe (e.g., when CFI=1), the performance is slightly worse than when the parts 211 of the PDCCH are spread over 2 or 3 symbols (e.g., CFI=2 or CFI=3). FIGS. 3B and 3C illustrate control regions which are 2 and 3 symbols, respectively, in size. The control regions in FIG. 3B and FIG. 3C allow some parts 211 of the PDCCH to be mapped to the second or third symbol of the subframe instead of the first symbol. The use of the larger control regions may occur, for example, during handover from a source network node to a target network node (e.g., network node 102). In FIGS. 3B and 3C, PDCCH parts 211 which were mapped to the first symbol may be moved to the second or third symbol, which may improve the resiliency of their transmission against noise.

While the control region size may be increased to better tolerate interference, this increase in control region size leads to a decrease in the size of the data region, which could decrease throughput of, e.g., downlink data. Accordingly, one aspect of the disclosure determines a final size of the control region based on a data region load. This load may indicate a load on at least one of a control channel (e.g., PDSCH) and a data channel (e.g., EPDCCH) in the data region. If, as a general example, the data region load is low, the initial size of the control region may be increased, while if the data region load is high, the initial size may be adopted as the final size of the control region.

Figure 4:
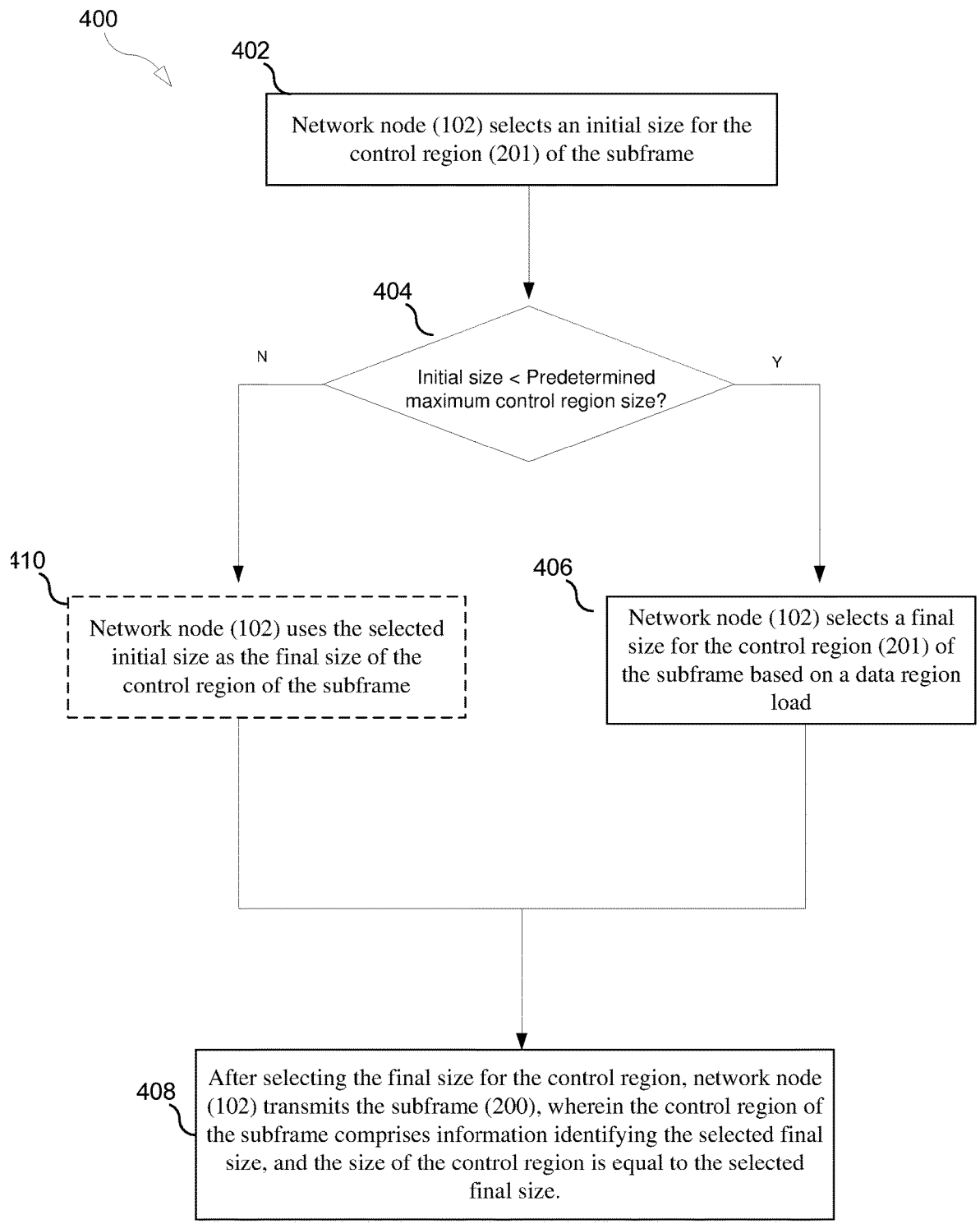
FIGS. 4-7 show flow charts illustrating various processes according to some embodiments of the present disclosure.

FIG. 4 shows a flow chart which illustrates example steps of a method 400 for a network node (e.g., node 102) to select the size of a control region of a subframe 200. The subframe 200 may comprise a control region (e.g., region 201) and a data region (e.g., region 220) which follows the control region. In an embodiment, method 400 may begin at step 402, in which network node 102 selects an initial size for the control region 201 of the subframe. As discussed later in the document, this selection of the initial size may be based on a control region load (e.g., PDCCH load) that indicates how many control channels, CCHs, are needed to assign or otherwise schedule RBs (e.g., PRBs) to all WCDs for which the subframe 200 is intended. In one example, the initial size may be selected as a minimize size, in a range of 1 to 3 symbols or a range of 2 to 4 symbols, which can still accommodate a quantity of CCHs needed for assigning the RBs or other transmission resources in the data region (e.g., shared data region) to intended recipient WCDs of the subframe.

In step 404, network node 102 may determine whether the initial size determined in step 402 is less than a predetermined maximum control region size. In LTE, the predetermined maximum control region size may be 4 symbols for a subframe bandwidth of 1.4 MHz and 3 symbols for all other bandwidths.

In step 406, in response to determining that the initial size of the control region is less than the predetermined maximum control region size, the network node 102 may select a final size for the control region 201 of the subframe based on a data region load. In an embodiment, the data region load indicates a load on at least one of a control channel and a data channel in the data region (e.g., based on a load on all PDSCHs and EPDCCHs in the data region). In an embodiment, the data region load indicates a number of users or number of WCDs for which the subframe is carrying data in the data region. In some cases, the data region load may be determined before the network node 102 selects the initial size for the control region in step 402. In some cases, the data region load may be determined only in response to the determination in step 404 that the initial size is less than the predetermined maximum control region size.

In step 408, after selecting the final size for the control region, network node 102 may transmit (e.g., broadcast) the subframe. The control region 201 of the subframe comprises information identifying the selected final size, and the size of the control region is equal to the selected final size.

In an embodiment, if the network node 102 determined in step 404 that the initial size of the control region is already the predetermined maximum control region size, the network node 102 may, in step 410, simply use the selected initial size as the final size of the control region.

Figure 5:
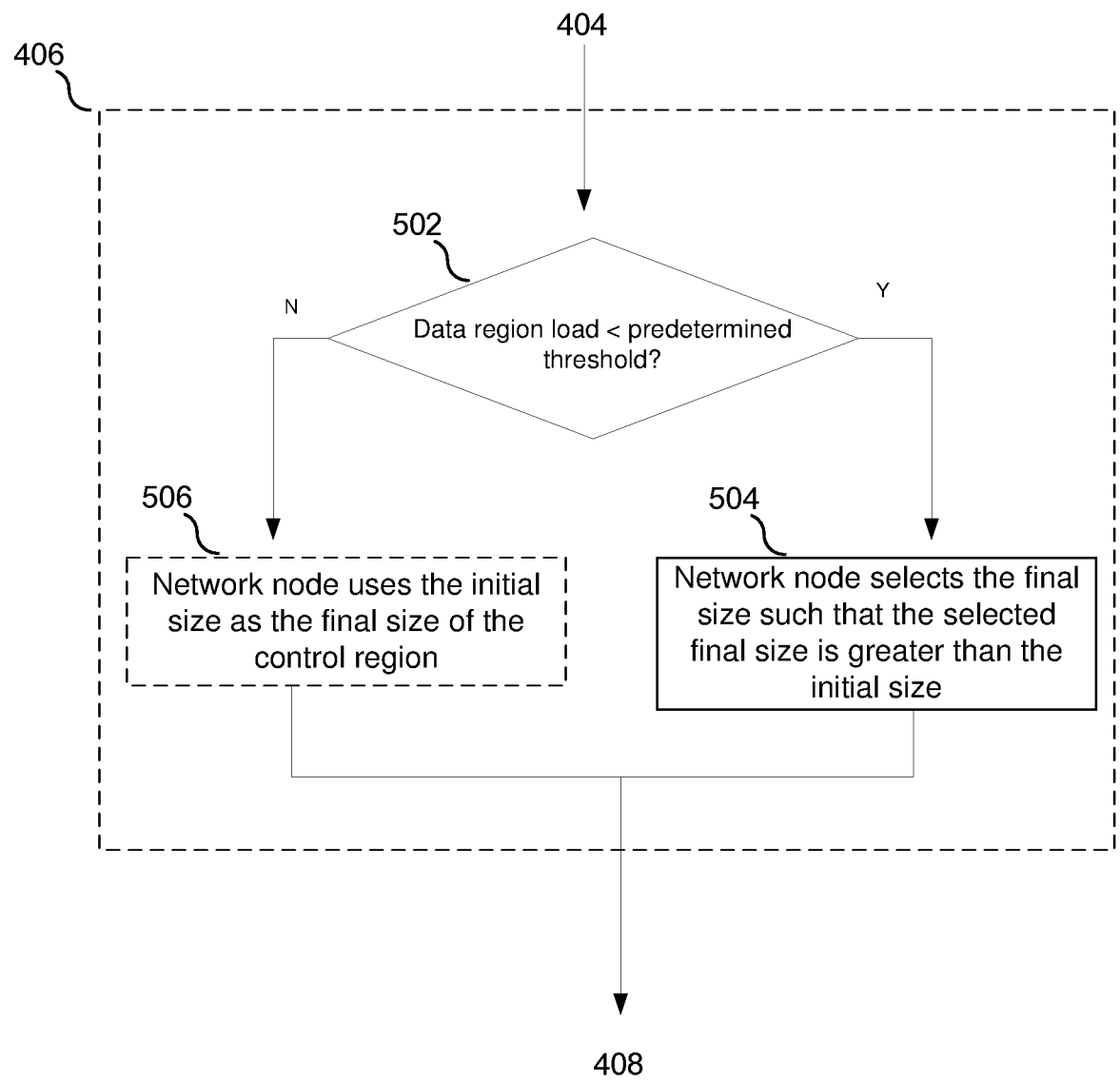

FIG. 5 illustrates a more specific example of the selection of a final size of the control region in step 406. In an embodiment, the selecting step may include, in step 502, the network node 102 determining whether the shared region load is less than a predetermined threshold. In some cases, the predetermined threshold may be expressed as a number of resource blocks, RBs (e.g., PRBs), such that the initial size of the control region may be increased based on whether more than a threshold number of RBs have been allocated in the data region. In some cases, the predetermined threshold may be expressed as a percentage of the number of allocated RBs in the data region relative to the maximum number of available RBs that can be allocated in the data region. Examples percentages used for the predetermined threshold may include 95% (95 allocated RBs/100 available RBs), 90% (90 allocated RBs/100 available RBs), or some other percentage.

In step 504, in response to determining that the data region load is less than the predetermined threshold, network node 102 selects the final size such that the selected final size is greater than the initial size. In some cases, the selected final size is less than or equal to the predetermined maximum control region size and does not impair transmission of control signaling or data signaling in the control channel and data channel, respectively, of the data region. For instance, if the initial size is 1 symbol, the network node may select a final size which is still less than or equal to a predetermined maximum control region size of 3 symbols and which does not impair signaling in PDSCHs and ePDCCHs of the data region. If selecting 3 symbols for the final size of the control region would make the data region too small to accommodate all the PDSCHs and ePDCCHs there, a final size of 2 symbols may instead be adopted for the control region. By selecting a final size that is greater than the initial size, control channel information may be re-assigned from a CCH in the first symbol to a CCH in the second symbol. For instance, a PDCCH may be allocated one or more CCEs that cover a range of CCH REs (e.g., 36 CCH REs). A portion of downlink control information, DCI, for the PDCCH may initially be assigned to a CCH RE in the first symbol. After the increased size is selected, that portion of DCI may be re-assigned to a CCH RE in the second symbol.

If, in step 506, the network node 102 determines that the data region load is not less than the predetermined threshold, the network node 102 may simply use the initial size as the final size of the control region.

Figure 6:
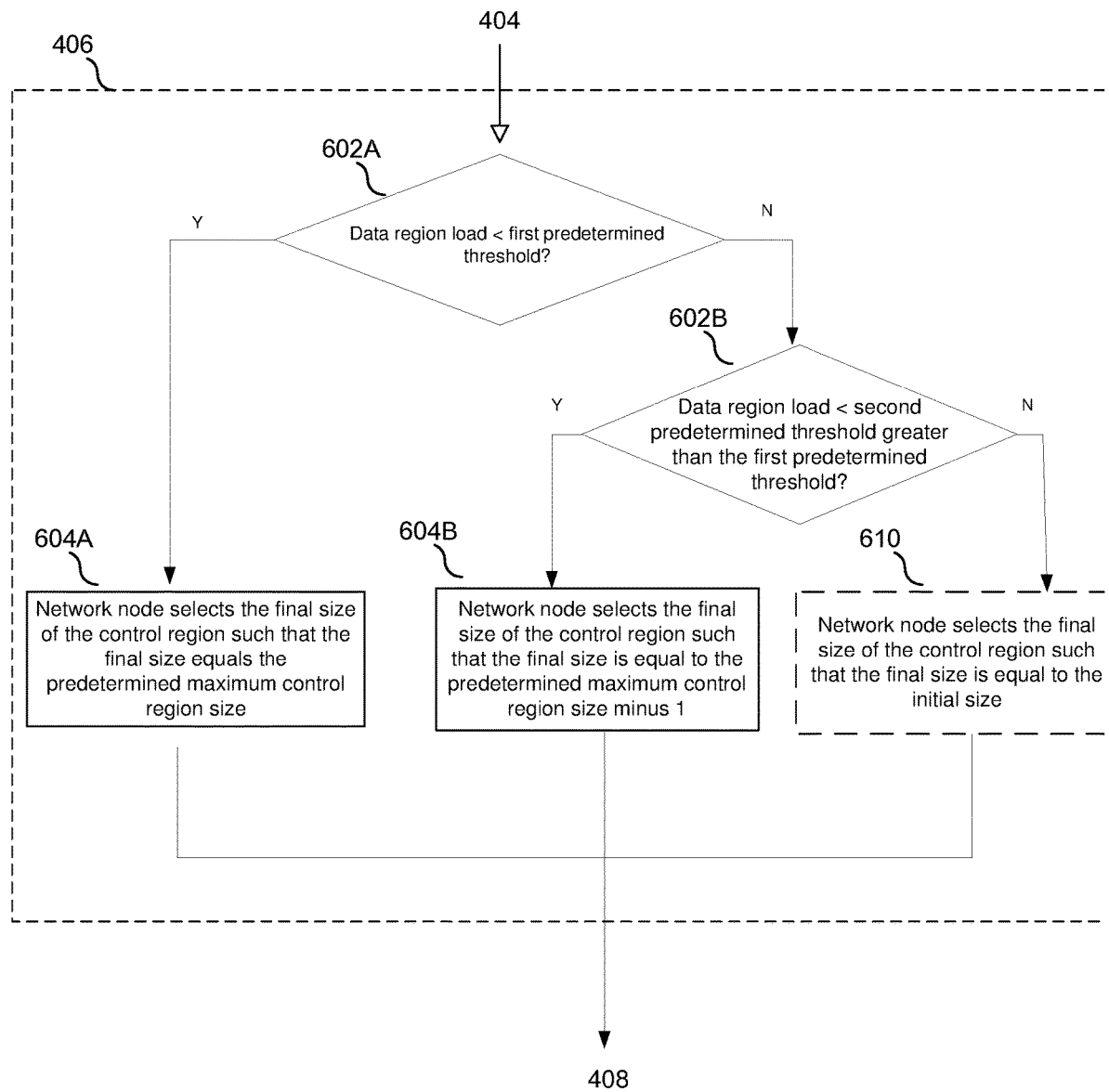

FIG. 6 illustrates another example of the selection of a final size of the control region in step 406. This example selection may involve two different thresholds: e.g., one for selecting a final size that is equal to the maximum control region size (e.g., CFI=3), and the other for selecting a final size that is equal to the maximum control region size minus 1 (e.g., CFI=2). In an embodiment, the selection of the final size includes step 602A, in which the network node 102 determines whether the data region load is less than a first predetermined threshold (e.g., 80%).

In response to determining that the data region load is less than the first predetermined threshold, the network node may in step 604A select the final size of the control region such that the final size equals the predetermined maximum control region size (e.g., CFI=3).

In response to determining that the data region load is not less than the first predetermined threshold, the network node may in step 602B determine whether the data region load is less than a second predetermined threshold (e.g., 90%) greater than the first predetermined threshold. In response to determining that the data region load is less than the second predetermined threshold, the network node may in step 604B select the final size of the control region such that the final size is equal to the predetermined maximum control region size minus 1 (e.g. CFI=3−1=2).

In response to determining that the data region load is not less than the second predetermined threshold, the network node may in step 610 select the final size of the control region such that the final size is equal to the initial size (e.g., CFI=1).

In an embodiment, if the initial size of the control region is already equal to the predetermined maximum control region size minus 1 (e.g., already equal to 2 symbols), the network node may skip step 602B and step 604B. For instance, if the initial size were already selected as 2 symbols, and the comparison in step 602A indicates that data region load is not less than the first predetermined threshold, the comparison in step 602B can be skipped, because either result in step 602B would lead the network node to set a final size of 2 symbols. Thus, in this situation, the network node 102 may select 2 symbols as the final size by proceeding to step 610 and skipping step 602B.

Figure 7:
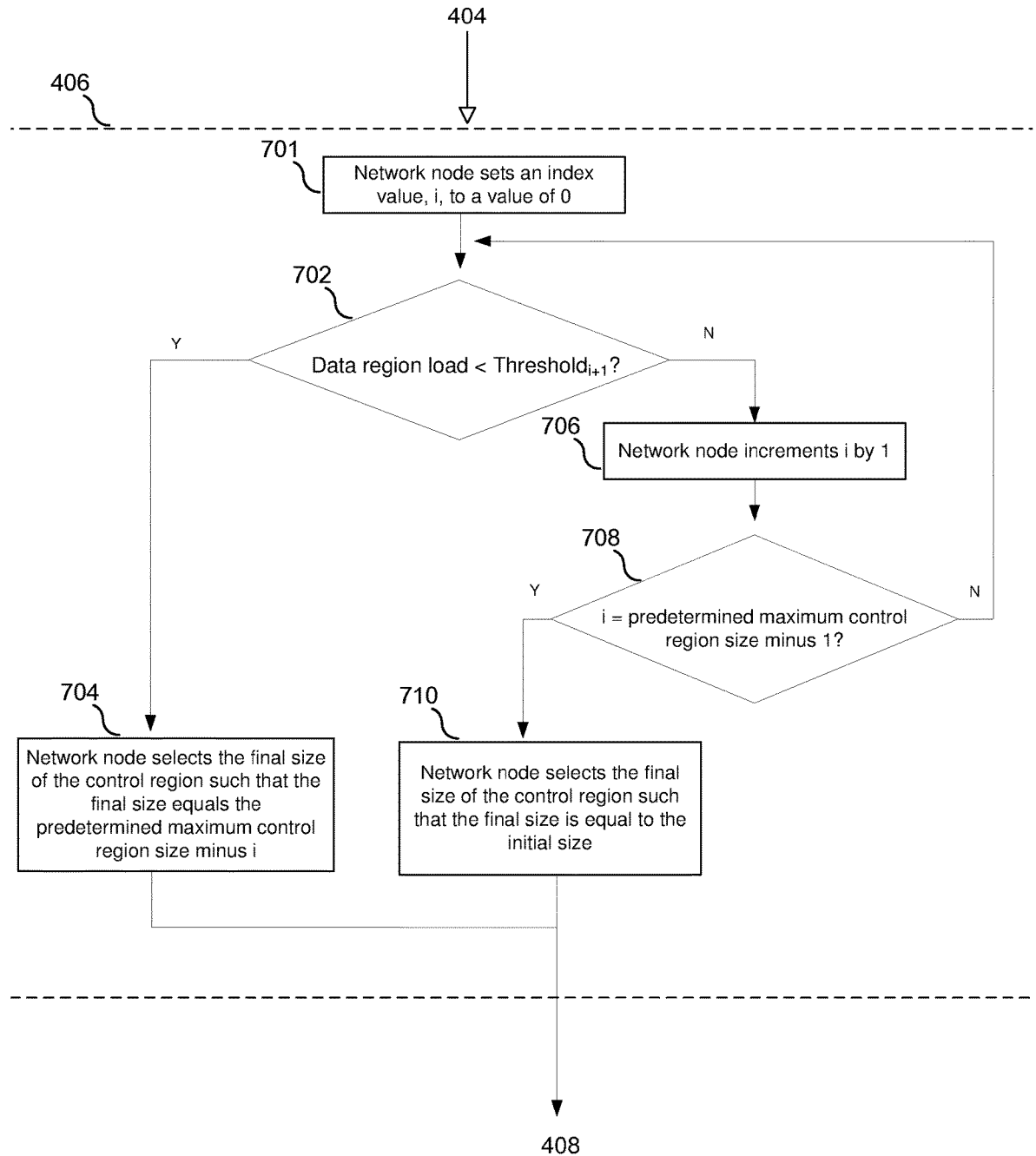

In an embodiment, the steps of FIG. 6 may apply to a situation in which the predetermined maximum control region size is 3. FIG. 7 illustrates a more general set of steps for determining a final size of the control region, for a more general predetermined maximum control region size. The steps may iterate through different thresholds for the data region load, and select a final size based on comparing the data region load to one or more of those thresholds. In step 701, the network node 102 may begin the iteration by setting an index value i to a value of 0 (i.e., i=0).

In step 702, the network node 102 may determine whether the data region load is less than $threshold_{i+1}$. For instance, $threshold_{0+1}$ (i.e., $threshold_1$) may correspond to the first predetermined threshold discussed above. If the data region load is less than $threshold_i$, the network node may in step 704 select the final size of the control region such that the final size equals the predetermined maximum control region size minus i. If i=0 in step 704, then the final size equals the predetermined maximum control region size.

If the data region load is not less than $threshold_{i+1}$ (e.g., not less than $threshold_1$ in the first iteration), the network node in step 706 may increment i by 1 (e.g. increment i to a value of 1). This allows the data region load to be compared against another threshold value. In an embodiment, the number of thresholds against which a data region load can be compared may be equal to the predetermined maximum control region size minus 1. Thus, the network node may in step 708 determine whether i is equal to the predetermined maximum control region size minus 1 (e.g., whether i is equal to 2). If i is not equal to the predetermined maximum control region size minus 1, then the network node may proceed to the next iteration, such that the comparison in step 702 may be compared with the incremented value of i. For example, if i is incremented to 1 for the next iteration, the data region load may be compared against $threshold_{i+1}$ (i.e., $threshold_2$), which may correspond to the second predetermined threshold discussed above.

If i is equal to the predetermined maximum control region size minus 1, the network node in step 710 may select the final size of the control region such that the final size is equal to the initial size. For example, the initial size may be equal to 1 symbol, and the predetermined maximum control region size may be equal to 3 symbols. If i is equal to the predetermined maximum control region size minus 1 (e.g., equal to 2), this implies that the data region load was determined in two previous iterations to be not less than threshold$_1$, and not less than threshold$_2$. This may mean that the control region size then cannot be increased to 3 symbols or even to 2 symbols. Thus, the network node in this example of step 710 may select the final size to be equal to the initial size of 1 symbol.

Selection of Initial Size of Control Region

In some cases, the selection of the initial size of the control region in step 402 may be based on a PDCCH load that indicates how many PDCCHs are to be transmitted in the control region of the subframe. When few PDCCHs are to be transmitted, the initial CFI value may be low, and when the PDCCH load is high, the initial CFI value may be set to a higher value in order to accommodate more PDCCHs. This allows support of many PDCCHs in high PDCCH load scenarios and to support a high PDSCH peak rate in low PDCCH load scenarios, since in the latter case more OFDM symbols may be available for PDSCH. This selection may be part of an adaptive CFI scheme.

Adaptively setting the control region size is discussed in U.S. Pat. No. 8,031,670, entitled "Systems and Methods for Selecting the Size of a Control Region of a Downlink Subframe." In one instance, it recites a method performed by a network node for setting the size of a control region of a subframe based on a set of one or more physical downlink control channels, PDCCHs, comprising: a) selecting a first control region size from a set of control region sizes and determining a subset of the PDCCHs from said set of PDCCHs that can be assigned to a control region having a size equal to the first control region size; b) selecting a second control region size from the set of control region sizes and determining a subset of the PDCCHs from said set of PDCCHs that can be assigned to a control region having a size equal to the second control region size; c) after performing step b), choosing a control region size for the subframe, wherein the control region size is chosen based, at least in part, on information pertaining to the subset of PDCCHs that can be assigned to a control region having a size equal to the chosen control region size; and d) setting the size of the control region of the subframe to the control region size chosen in step c).

Exemplary Network Node

Figure 8:
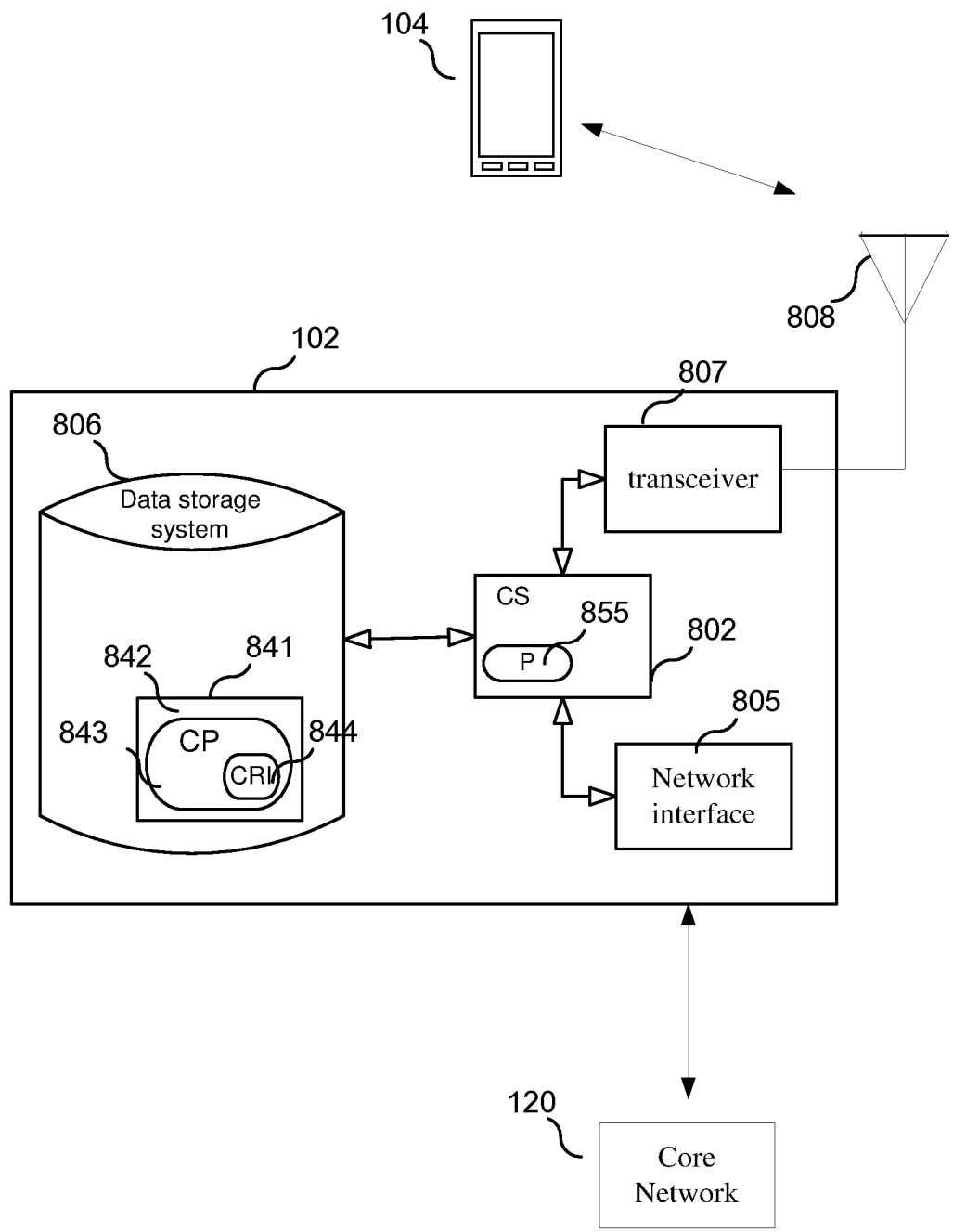

FIG. 8 is a block diagram of an embodiment of network node 102 (e.g., an eNB, NB, or radio network controller (RNC)). As shown in FIG. 8, network node 102 may include: a computer system (CS) 802, which may include one or more processors 855 (e.g., a general purpose microprocessor and/or one or more other data processing circuits, such as an application specific integrated circuit (ASIC), field-programmable gate arrays (FPGAs), and the like); a network interface 805 for use in connecting the network node to a network (e.g., core network) and communicating with other units connected to the network; a transceiver 807 coupled to an antenna 808 for wirelessly communicating with WCDs; and a data storage system 806 for storing information (e.g., network slice information received from network management node (e.g., NM or DM), which may include one or more non-volatile storage devices and/or one or more volatile storage devices (e.g., random access memory (RAM)). In embodiments where computer system 802 includes a general purpose microprocessor, a computer program product (CPP) 841 may be provided. CPP 841 includes a computer readable medium (CRM) 842 storing a computer program (CP) 843 comprising computer readable instructions (CRI) 844. CRM 842 may be a non-transitory computer readable medium (i.e., magnetic media (e.g., a hard disk), optical media (e.g., a DVD), flash memory, and the like). In some embodiments, the CRI 844 of computer program 843 is configured such that when executed by data processing system 802, the CRI causes the computer system to perform steps described herein. In other embodiments, computer system 802 may consist merely of one or more ASICs. Hence, the features of the embodiments described herein may be implemented in hardware and/or software.

In an embodiment, the network node 102 includes: a) means for selecting an initial size for the control region (201) of the subframe; b) means for determining whether the initial size for the control region is less than a predetermined maximum control region size; c) means for selecting, in response to the determination that the initial size is less than the predetermined maximum control region size, a final size for the control region of the subframe based on a data region load; and d) means for transmitting, after selecting the final size for the control region, the subframe, wherein the control region of the subframe comprises information identifying the selected final size.

While various embodiments of the present invention have been described above, it should be understood that they have been presented by way of example only, and not limitation. Thus, the breadth and scope of the present invention should not be limited by any of the above-described exemplary embodiments.

Additionally, while the processes described above and illustrated in the drawings are shown as a sequence of steps, this was done solely for the sake of illustration. Accordingly, it is contemplated that some steps may be added, some steps may be omitted, and the order of the steps may be re-arranged.

The invention claimed is:

1. A method, performed by a network node, for setting a size of a control region of a subframe, the subframe comprising the control region and a data region which follows the control region, the method comprising the network node:
selecting an initial size for the control region of the subframe;
determining whether the initial size for the control region is less than a predetermined maximum control region size;
in response to determining that the initial size is less than the predetermined maximum control region size, selecting a final size for the control region of the subframe, wherein selecting the final size for the control region comprises:
determining whether a data region load is less than a first predetermined threshold, wherein in response to determining that the data region load is not less than the first predetermined threshold determining whether the data region load is less than a second predetermined threshold and in response to determining that the data region load is less than the second predetermined threshold, selecting the final size of the control region such that the final size is equal to the predetermined maximum control region size minus 1; and
after selecting the final size for the control region, transmitting the subframe, wherein the control region of the subframe comprises information identifying the selected final size, and the size of the control region is equal to the selected final size.

2. The method of claim 1, wherein the selecting the final size for the control region comprises:
determining whether the data region load is less than a predetermined threshold; in response to determining that the data region load is less than the predetermined threshold, selecting the final size such that the selected final size is greater than the initial size.

3. The method of claim 2, wherein the selected final size is less than or equal to the predetermined maximum control region size and does not impair transmission of control signaling or data signaling in a control channel and a data channel, respectively, of the data region.

4. The method of claim 1, wherein the selecting the final size for the control region comprises:
determining whether the data region load is less than a first predetermined threshold; in response to determining that the data region load is less than the first predetermined threshold, selecting the final size of the control region such that the final size equals the predetermined maximum control region size.

5. The method of claim 1, wherein a time duration of the subframe is divided into a plurality of symbols, and wherein the predetermined maximum control region size is equal to three symbols.

6. The method of claim 1, wherein the data region load indicates a load on all physical downlink shared channels (PDSCHs) in the data region and on all Enhanced Physical Downlink Control Channels (EPDCCHs) in the data region.

7. The method of claim 1:
wherein the selected initial size of the control region is a minimum size which supports a Physical Downlink Control Channel (PDCCH) load on the control region;
wherein the PDCCH load indicates how many PDCCHs are to be transmitted in the control region of the subframe.

8. The method of claim 1, wherein the selection of the final size for the control region is independent of a Physical Downlink Control Channel (PDCCH) load.

9. The method of claim 1:
wherein a time duration of the subframe is divided into a plurality of symbols; and
wherein the predetermined maximum control region size is equal to three symbols or four symbols.

10. The method of claim 1, further comprising re-assigning control channel information from a control channel resource element (CCH RE) in a first symbol of the control region to a CCH RE in a second symbol of the control region.

11. The method of claim 1:
further comprising determining a data region load;
wherein the data region load is determined as a percentage of a maximum number of resource blocks (RBs) that can be allocated to the control channel and the data channel in the data region of the subframe.

12. The method of claim 1, wherein the data region load is determined before determining whether the initial size is less than the predetermined maximum control region size.

13. A network node capable of transmitting a subframe that comprises a control region and a data region which follows the control region, the network node comprising:
processing circuitry; and
memory containing instructions executable by the processing circuitry whereby the network node is operative to:
select an initial size for the control region of the subframe;
determine whether the initial size for the control region is less than a predetermined maximum control region size;
in response to determining that the initial size is less than the predetermined maximum control region size, select a final size for the control region of the subframe, wherein selecting the final size for the control region comprises:
determining whether a data region load is less than a first predetermined threshold, wherein in response to determining that the data region load is not less than the first predetermined threshold determining whether the data region load is less than a second predetermined threshold and in response to determining that the data region load is less than the second predetermined threshold, selecting the final size of the control region such that the final size is equal to the predetermined maximum control region size minus 1; and
after selecting the final size for the control region, transmit the subframe, wherein the control region of the subframe comprises information identifying the selected final size, and the size of the control region is equal to the selected final size.

14. The network node of claim 13, wherein the instructions are such that the network node is operative to select the final size for the control region by:
determining whether the data region load is less than a predetermined threshold; and in response to the determination that the data region load is less than the predetermined threshold, select the final size such that the selected final size is greater than the initial size.

15. The network node of claim 14, wherein the selected final size is less than or equal to the predetermined maximum control region size and does not impair transmission of control signaling or data signaling in a control channel and a data channel, respectively, of the data region.

16. The network node of claim 13, wherein the instructions are such that the network node is operative to select the final size for the control region by:
determining whether the data region load is less than a first predetermined threshold; in response to determining that the data region load is less than the first predetermined threshold, selecting the final size of the control region such that the final size equals the predetermined maximum control region size.

17. The network node of claim 13, wherein a time duration of the subframe is divided into a plurality of symbols, and wherein the predetermined maximum control region size is equal to three symbols.

18. The network node of claim 13, wherein the data region load indicates a load on all physical downlink shared channels (PDSCHs) in the data region and on all Enhanced Physical Downlink Control Channels (EPDCCHs) in the data region.

19. The network node of claim 13:
wherein the instructions are such that the network node is operative to, select the initial size of the control region as a minimum size which supports a Physical Downlink Control Channel (PDCCH) load on the control region; and
wherein the PDCCH load indicates how many PDCCHs are to be transmitted in the control region of the subframe.

20. The network node of claim 19, wherein the instructions are such that the network node is operative to select the final size for the control region independent of the PDCCH load.

21. The network node of claim 13, wherein a time duration of the subframe is divided into a plurality of symbols, and wherein the predetermined maximum control region size is equal to three symbols or four symbols.

22. The network node of claim 13, wherein the instructions are such that the network node is operative to re-assign control channel information from a control channel resource element (CCH RE) in a first symbol of the control region to a CCH RE in a second symbol of the control region.

23. The network node of claim 13:
   wherein the instructions are such that the network node is operative to determine a data region load;
   wherein the data region load is determined as a percentage of a maximum number of resource blocks (RBs) that can be allocated to the control channel and the data channel in the data region of the subframe.

24. The network node of claim 13, wherein the instructions are such that the network node is operative to determine the data region load before determining whether the initial size is less than the predetermined maximum control region size.

* * * * *